Sept. 5, 1944.     B. G. CARLSON     2,357,381
FLIGHT INSTRUMENT
Filed April 29, 1943
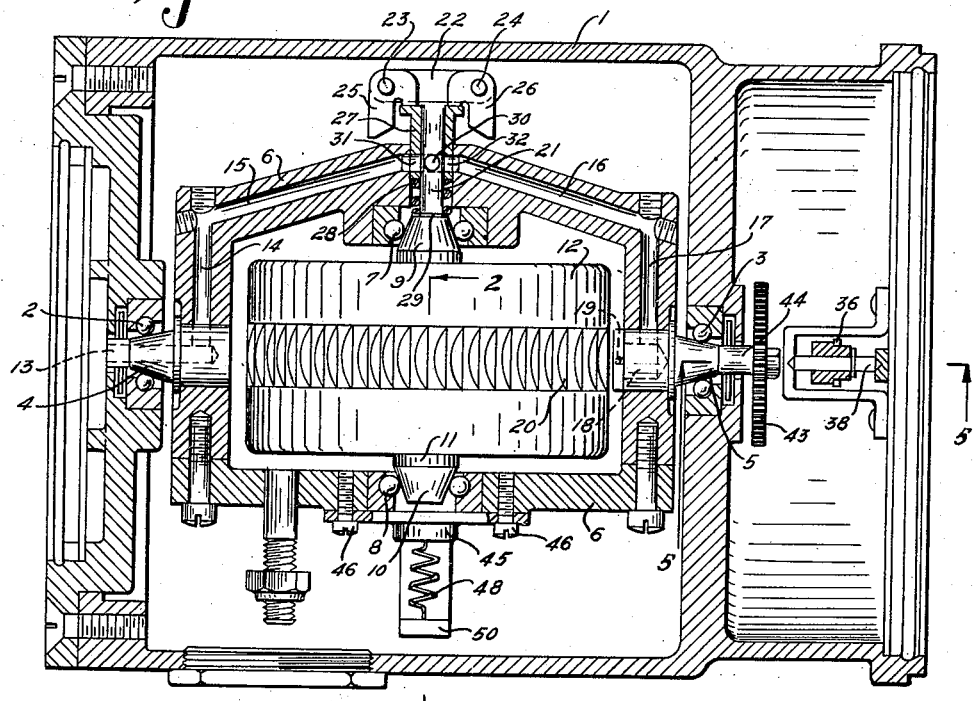
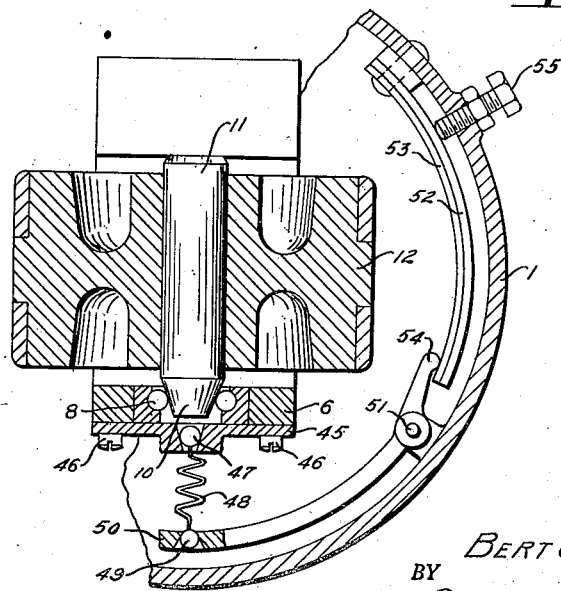
INVENTOR.
BERT G. CARLSON
BY
*Frank N. Harmon*
ATTORNEY Patented Sept. 5, 1944

2,357,381

UNITED STATES PATENT OFFICE 2,357,381

FLIGHT INSTRUMENT

Bert G. Carlson, Erieside, Ohio, assignor to Jack & Heintz, Inc., Bedford, Ohio, a corporation of Ohio Application April 29, 1943, Serial No. 485,085

2 Claims. (Cl. 33—204)

This invention relates in general to automatic pilot gyros and more particularly to improvements in directional gyros.

One of the primary objects of the invention is to provide a directional gyro with means for automatically controlling and making constant the speed of rotation of the gyro wheel so that the precessional effect will be uniform under the same amount and degree of turns of the aircraft carrying the automatic pilot.

Another important object is to provide further means for such uniformity by predeterminedly spring loading the gyro and also providing automatic temperature compensation for such spring loading means by which the rate of turn as well as the amount of turn may be accurately determined and appropriately indicated.

With the foregoing and other objects in view, the invention resides in the combination of parts and in the details of construction hereinafter set forth in the following description and appended claims, certain embodiments thereof being illustrated in the accompanying drawing, in which:

Figure 1 is a view in cross section taken through the directional gyro box and gimbal frame, showing the gyro wheel in top plan view; and Figure 2 is a partial view in section through the gyro wheel and one pivot bearing taken along line 2—2 of Figure 1.

Referring more particularly to the drawing, the gyro box 1 houses bearing assemblies 2 and 3 for pivots 4 and 5 of a gimbal frame 6 which, in turn, houses bearing assemblies 7 and 8 for pivots 9 and 10 of the shaft 11 of a directional gyro wheel 12.

The gyro wheel may be air spun, in which event the air may be drawn in by suction through a passage 13 in the pivot 4, thence through passages 14, 15, 16 and 17 in the gimbal frame and thence through passage 18 in shaft 11 to and through a restricted jet 19 adjacent the buckets 20 of the gyro wheel 12.

As a means for automatically controlling and making uniform the speed of rotation of the gyro wheel, there is provided an extension shaft 21 rotating with the gyro wheel shaft 11. This shaft 21 carries a plate 22 to which are pivotally attached at 23 and 24, two or more pivoted weighted arms 25 and 26 in the nature of a speed governor. Surrounding shaft 21, to rotate therewith, is a sleeve 27 which bears against a compression coil spring 28 between the same and a collar 29 resting on pivot 9. Shaft 21 is provided with an aperture 30 extending therethrough to register with passages 15 and 16 and apertures 31 and 32 of sleeve 27 when the latter is in the normal position shown in Figure 1.

When, however, the speed of rotation of the gyro wheel exceeds a certain predetermined amount the two pivoted weights 25 and 26 move upwardly and outwardly as they rotate with the shaft 11, due to centrifugal force and as they do they exert a downward pressure on the sleeve 27 against the action of spring 28. This brings the sleeve apertures 31 and 32 out of registry with passages 15 and 16 and thus the supply of incoming air to the jet 19 and the buckets is cut off. This reduces the pressure air flow on the buckets and the speed of rotation of the gyro wheel decreases. This decrease of speed of rotation lessens the centrifugal force tending to keep the weights 25 and 26 maintained upward and outward and the spring 28 forces sleeve 27 upwardly to bring its ports 31 and 32 in registry with passages 15 and 16, as shown in Figure 1, restoring the normal flow of air to maintain the normal desired predetermined speed of rotation of the gyro wheel.

As stated before, the gyro is spring loaded to resist precession and means are provided for temperature compensation of such spring loading. This is accomplished by securing a plate 45 by means of bolts 46 to the gimbal 6. This plate is apertured to receive a ball 47 to which is secured a tension coil spring 48 to the other end of which is secured a ball 49 fitting in a recess of an arm 50 pivoted to a bracket on the box at 51. The bracket also has secured thereto a temperature responsive bimetallic spring element 52 secured thereto at 53, the other end of which engages the rear extension 54 of arm 50 and tending to exert a pulling effect on spring 48 to put the latter in tension and thus spring load the gyro. Thus a variance in temperature causes a variance in the spring loading of the gyro. For the purpose of accurate adjustment of the bimetallic temperature compensating spring element there is provided an adjustable set screw 55 bearing inwardly against the element 52.

I claim:

1. In a directional indicator for aircraft showing the direction and amount of deviation from course, comprising a two-degree-of-freedom gyro mounted for precession through an angle proportional to the rate of turn of the aircraft, said gyro being provided with resilient constraining means, said constraining means comprising a pivoted lever carried by the housing of said gyro and a tension spring secured to one free end thereof and the movable support for said gyro for permitting precession of said gyro, and adjustable bimetallic spring means bearing resiliently inwardly on the other end of said pivoted lever for maintaining said spring under tension and varying the tension in accordance with the variations in temperature for automatically compensating for temperature changes and the effect that such changes would otherwise have on the force of said resilient constraining means.

2. In a directional indicator for aircraft showing the direction and amount of deviation from course, comprising a two-degree-of-freedom gyro mounted for precession through an angle proportional to the rate of turn of the aircraft, said gyro being provided with resilient constraining means, said constraining means comprising a pivoted lever carried by the housing of said gyro and a tension spring secured to a free end thereof and the movable support for said gyro for yieldingly opposing precession of said gyro, and adjustable bimetallic means for automatically compensating for temperature changes and the effect that such changes would otherwise have on the force of said resilient constraining means, said adjustable bimetallic means being secured to said housing and bearing on said lever to maintain said spring under tension.

BERT G. CARLSON.